(12) United States Patent
Oto

(10) Patent No.: US 8,000,208 B2
(45) Date of Patent: Aug. 16, 2011

(54) LAMINATED WAVE PLATE AND OPTICAL PICKUP DEVICE USING THE SAME

(75) Inventor: Masayuki Oto, Zama (JP)

(73) Assignee: Epson Toyocom Corporation (JP)

( * ) Notice: Subject to any disclaimer, the term of this patent is extended or adjusted under 35 U.S.C. 154(b) by 418 days.

(21) Appl. No.: 12/249,020

(22) Filed: Oct. 10, 2008

(65) Prior Publication Data

US 2009/0097384 A1    Apr. 16, 2009

(30) Foreign Application Priority Data

Oct. 10, 2007  (JP) ................................. 2007-264199
Apr. 24, 2008  (JP) ................................. 2008-113469
Sep. 5, 2008   (JP) ................................. 2008-227973

(51) Int. Cl.
*G11B 7/00* (2006.01)

(52) U.S. Cl. ............................. 369/112.22; 369/112.01

(58) Field of Classification Search ............ 369/112.22, 369/112.01, 112.16, 112.17, 110.02, 110.04; 359/483, 489, 494–497, 500
See application file for complete search history.

(56) References Cited

U.S. PATENT DOCUMENTS

| 2004/0246875 A1* | 12/2004 | Ooto | ......................... 369/112.22 |
| 2005/0180296 A1* | 8/2005 | Ooto | ......................... 369/112.22 |
| 2007/0247633 A1* | 10/2007 | Oto | ............................... 356/487 |

FOREIGN PATENT DOCUMENTS

| JP | 2001-209963 | 8/2001 |
| JP | 2001-281432 | 10/2001 |
| JP | 2002-014228 | 1/2002 |
| JP | 2002-250815 | 9/2002 |
| JP | 2004-341471 | 12/2004 |
| JP | 2007-304572 | 11/2007 |
| JP | 2007-311012 | 11/2007 |
| WO | WO03-091768 | 11/2003 |

* cited by examiner

*Primary Examiner* — Thang V Tran
(74) *Attorney, Agent, or Firm* — Harness, Dickey & Pierce, P.L.C.

(57) ABSTRACT

A laminated wave plate that corresponds to a plurality of wavelengths including at least two wavelengths of $\lambda_A$ and $\lambda_B$, and includes a first wave plate disposed on an incident side and a second wave plate disposed on an emitting side, the first wave plate and the second wave plate being laminated in such a manner that their optical axes are intersected each other, includes the following equations from (1) to (5):

$$\Gamma_{A1} = 360° + 360° \times 2N_A \quad (1);$$

$$\Gamma_{A2} = 180° + 360° \times N_A \quad (2);$$

$$\Gamma_{B1} = 360° \times 2N_B \quad (3);$$

$$\Gamma_{B2} = 360° \times N_B \quad (4); \text{ and}$$

$$N_B = (\Delta n_B/\Delta n_A) \times (\lambda_A/\lambda_B) \times (0.5 + N_A) \quad (5),$$

in which
$\Gamma_{A1}$ is a phase difference of the wavelength $\lambda_A$ at the first wave plate,
$\Gamma_{A2}$ is a phase difference of the wavelength $\lambda_A$ at the second wave plate,
$\Gamma_{B1}$ is a phase difference of the wavelength $\lambda_B$ at the first wave plate,
$\Gamma_{B2}$ is a phase difference of the wavelength $\lambda_B$ at the second wave plate,
$\theta_1$ is an in-plane azimuth of the first wave plate,
$\theta_2$ is an in-plane azimuth of the second wave plate,
$\Delta n_A$ is a birefringent difference that is a difference ($ne_A - no_A$) between a normal ray refractive index $no_A$ and an abnormal ray refractive index $ne_A$ of the wavelength $\lambda_A$, and
$\Delta n_B$ is a birefringent difference that is a difference ($ne_B - no_B$) between a normal ray refractive index $no_B$ and an abnormal ray refractive index $ne_B$ of the wavelength $\lambda_B$,
under conditions of $\theta_1 = -21°$, and $\theta_2 = 45°$.

4 Claims, 13 Drawing Sheets

LAMINATED WAVE PLATE AND OPTICAL PICKUP DEVICE USING THE SAME

BACKGROUND

1. Technical Field

The present invention relates to a laminated wave plate and an optical pickup device using the same.

2. Related Art

In optical pickup devices recording and regenerating an optical recording medium such as an optical disk including a compact disc (CD) and a digital versatile disc (DVD) or a magnet optical disc, a wave plate corresponding to a plurality of wavelengths is used because compatibility between CD and DVD is required.

JP-A-2001-209963 as a first example discloses a wave plate having a phase difference of 1625 nm. A relation between the phase difference of 1625 nm and laser light having a wavelength of 650 nm is expressed as 1625 nm=325 nm+650 nm×2. The relation between 325 nm and 650 nm is practically expressed as 325 nm/650 nm×2π=π in radian. Thus the wave plate generates a phase difference of π. In addition, a relation between the phase difference of 1625 nm and laser light having a wavelength of 790 nm is expressed as 1625 nm=835 nm+790 nm×1. The relation between 835 nm and 790 nm is practically expressed as 835 nm/790 nm×2π≈2π. Thus the wave plate generates a phase difference of 2π. Further, the first example discloses a wave plate having a phase difference of 1950 nm. A relation between the phase difference of 1950 nm and laser light having a wavelength of 650 nm is expressed as 1950 nm=650 nm+650 nm×2. The relation between 650 nm and 650 nm is practically expressed as 650 nm/650 nm×2π=2π in radian. Thus the wave plate generates a phase difference of 2π. In addition, a relation between the phase difference of 1950 nm and laser light having a wavelength of 790 nm is expressed as 1950 nm=370 nm+790 nm×2. The relation between 370 nm and 790 nm is practically expressed as 370 nm/790 nm×2π≈π in radian. Thus the wave plate generates a phase difference of π.

JP-A-2002-14228 as a second example discloses a phase element. The phase element is structured such that two transparent substrates are layered in a manner interposing a birefringent organic thin film therebetween. A phase difference with respect to laser light having a wavelength of 650 nm is expressed as 2π(m1−½). Thus a phase difference of π is substantively generated. A phase difference with respect to laser light having a wavelength of 790 nm is expressed as 2πm2. Thus a phase difference of 2π is generated.

JP-A-2002-250815 as a third example discloses a laminated wave plate. The laminated wave plate of the third example is structured such that a first wave plate (made of a birefringent organic material) having a phase difference of 593 nm (=¾×790 nm) and a second wave plate (made of a birefringent organic material) having a phase difference of 395 nm (=½×790 nm) with respect to light in a wavelength band of 790 nm are laminated in a manner intersecting their optical axes by 24°. The laminated wave plate rotates a polarization plane of linearly polarized light having a wavelength of 660 nm by 45° and converts linearly polarized light having a wavelength of 790 nm to circularly polarized light.

Further, WO 2003/91768 as a fourth example discloses the following laminated wave plate. The laminated wave plate of the fourth example is structured such that a first wave plate having a phase difference of 2700° (=180°+360°×7, that is, a seventh mode 180°. The substantive phase difference is 180°.) and a second wave plate having a phase difference of 630° (=270°+360°×1, that is, a first mode 270°. The substantive phase difference is 270°.) with respect to a wavelength of 655 nm are laminated in a manner intersecting their optical axes by 45°. The laminated wave plate functions as a quarter wave plate with respect to light having a wavelength of 655 nm and functions as a half wave plate with respect to light having a wavelength of 785 nm. Further, the fourth example discloses the following laminated wave plate. The laminated wave plate is structured such that a first wave plate having a phase difference of 2700° (=180°+360°×7, that is, a seventh mode 180°. The substantive phase difference is 180°.) and a second wave plate having a phase difference of 1260° (=180°+360°×3, that is, a third mode 180°. The substantive phase difference is 180°.) with respect to a wavelength of 655 nm are laminated in a manner intersecting their optical axes by 45°. The laminated wave plate functions as a half wave plate with respect to light having a wavelength of 655 nm and functions as a 2/2 wave plate with respect to light having a wavelength of 785 nm.

However, a phase difference of a wave plate is a function of a wavelength, so as to have such wavelength dependency that if a wavelength changes, a phase difference also changes. Therefore, in the wave plates disclosed in the first to third examples, a phase difference generated in laser light largely changes disadvantageously.

That is, since the phase difference has wavelength dependency, it largely changes if a wavelength shifts from a predetermined value as shown in FIG. 12 showing a relation of a wavelength and a phase difference. For example, this wave plate is mounted on an optical pickup device. If a wavelength of laser light emitted from a light source is shifted due to temperature drift and the like generated at the light source of a semiconductor laser that is used, for example, a phase difference generated in the laser light transmitting through the wave plate largely changes.

The laminated wave plate disclosed in the fourth example has a phase difference compensation function that compensates a change of a phase difference generated in laser light which transmits through the laminated wave plate even if a wavelength emitted from the light source is shifted, whereby the wavelength dependency is improved. However, the laminated wave plate cannot rotate a polarization plane of linearly polarized laser light being incident on the laminated wave plate by 90° disadvantageously.

A case where laser light is incident on a laminated wave plate 61 in which a first wave plate 62 and a second wave plate 63 are laminated as shown in FIGS. 13A and 13B will be described with Poincare sphere shown in FIG. 13C.

As shown in FIGS. 13A and 13B, the laminated wave plate 61 is structured such that the first wave plate 62 disposed at an incident side of the laser light and the second wave plate 63 disposed at an emitting side of the laser light are laminated in a manner intersecting an optical axis 62a of the first wave plate 62 and an optical axis 63a of the second wave plate 63 by an intersecting angle of 45° (=57°−12°).

Referring to FIG. 13C, when a linearly polarized light 64 incident from a point P0 on the equator transmits through the first wave plate 62, a phase difference of 180°+360°×7 is generated, so that the light 64 rotates by 180°+360°×7 around an axis R1 as a rotation axis to reach a point P1. Further, when the light 64 transmits through the second wave plate 63, a phase difference of 180°+360°×3 is generated, so that the light 64 rotates by 180°+360°×3 around an axis R2 as a rotation axis to reach a point P2. The point P2 is positioned on the equator of the Poincare sphere, and the phase difference generated when the linearly polarized light 64 transmits through the first wave plate 62 and the second wave plate 63 is substantively 180°. However, a polarization plane of the linearly polarized light 65 emitted from the laminated wave plate 61 is rotated by approximately 120° with respect to a polarization plane of the linearly polarized light 64. That is, a polarization plane of linearly polarized light that is incident is not orthogonal to a polarization plane of linearly polarized light that is emitted. Therefore, the laminated wave plate is not suitable to a case where p-polarized light is converted into s-polarized light or an optical system (optical use) in which abnormal light is required to be converted into normal light.

Therefore a wave plate described as follows is required to be realized. The wave plate can compensate variation of phase difference generated in the wave plate, on which laser light is incident, so as to keep the variation to be minimum even when the wavelength of the laser light emitted from a light source is shifted due to temperature drift and the like generated at the light source, and can rotate a polarization plane of linearly polarized light by 90° in a case where the plate functions as a half wave plate.

Such requirement is imposed not only on an optical element corresponding to two types of wavelengths having a wavelength range of around 785 nm and a wavelength range of around 655 nm in an optical pickup device compatible between CD and DVD, but also on an optical element corresponding to three types of wavelengths having a wavelength range of around 785 nm for CD, a wavelength range of around 655 nm for DVD, and a wavelength range of around 405 nm for Blu-ray, HDDVD, or the like.

SUMMARY

An advantage of the present invention is to provide a laminated wave plate and an optical pickup device using the laminated wave plate that can correspond to a plurality of types of wavelengths; can compensate a phase difference so as to make variation of the phase difference generated on a wave plate be minimum even when a wavelength that is used is shifted from a predetermined value; and can rotate a polarization plane of linear polarized light by 90° when the laminated wave plate functions as a half wave plate.

According to a first aspect of the invention, a laminated wave plate corresponds to a plurality of wavelengths including at least two wavelengths of $\lambda_A$ and $\lambda_B$, and includes a first wave plate disposed on an incident side and a second wave plate disposed on an emitting side, the first wave plate and the second wave plate being laminated in such a manner that their optical axes are intersected each other. The laminated wave plate includes the following equations from (1) to (5):

$$\Gamma_{A1} = 360° + 360° \times 2N_A \quad (1);$$

$$\Gamma_{A2} = 180° + 360° \times N_A \quad (2);$$

$$\Gamma_{B1} = 360° \times 2N_B \quad (3);$$

$$\Gamma_{B2} = 360° \times N_B \quad (4); \text{ and}$$

$$N_B = (\Delta n_B/\Delta n_A) \times (\lambda_A/\lambda_B) \times (0.5 + N_A) \quad (5),$$

in which $\Gamma_{A1}$ is a phase difference of the wavelength $\lambda_A$ at the first wave plate,
$\Gamma_{A2}$ is a phase difference of the wavelength $\lambda_A$ at the second wave plate,
$\Gamma_{B1}$ is a phase difference of the wavelength $\lambda_B$ at the first wave plate,
$\Gamma_{B2}$ is a phase difference of the wavelength $\lambda_B$ at the second wave plate,
$\theta_1$ is an in-plane azimuth of the first wave plate,
$\theta_2$ is an in-plane azimuth of the second wave plate,
$\Delta n_A$ is a birefringent difference that is a difference ($ne_A - no_A$) between a normal ray refractive index $no_A$ and an abnormal ray refractive index $ne_A$ of the wavelength $\lambda_A$, and
$\Delta n_B$ is a birefringent difference that is a difference ($ne_B - no_B$) between a normal ray refractive index $no_B$ and an abnormal ray refractive index $ne_B$ of the wavelength $\lambda_B$, under conditions of $\theta_1 = -21°$, and $\theta_2 = 45°$.

Here, $N_B$ can be derived from the formulas (2) and (4).
From the formula (2), a formula (2)' is derived.

$$\Gamma_{A2} = 180° + 360° \times N_A = \{360° \times \Delta n_A \times d_2\}/\lambda_A \quad (2)'$$

Here, $d_2$ denotes a thickness dimension of the second wave plate 2.
From the formula (4), a formula (4)' is derived.

$$\Gamma_{B2} = 360° \times N_B = \{360° \times \Delta n_B \times d_2\}/\lambda_B \quad (4)'$$

The formulas (2)' and (4)' are expressed as the formula (5) by combining $d_2$.

In the first aspect, the laminated wave plate including the first wave plate and the second wave plate functions as a half wave plate with respect to the wavelength $\lambda_A$ from the formulas (1) and (2), and the laminated wave plate functions as a $\lambda$ plate with respect to $\lambda_B$ from the formulas (3) and (4).

From the formula (5), even if the wavelength of incident light really used is shorter than the predetermined wavelength $\lambda_A$ and $\lambda_B$, the short amount of phase difference is cancelled, while, even if the wavelength of the light really used is longer than the predetermined wavelength $\lambda_A$ and $\lambda_B$, the long amount of phase difference is cancelled. Therefore, the wavelength of light really emitted is not shifted from the predetermined value.

It is preferable that a combination of ($N_A$, $N_B$) be one of the following combinations from (a1) to (a4):

$$(N_A, N_B) = (2.0, 2.0) \quad (a1);$$

$$(N_A, N_B) = (3.0, 3.0) \quad (a2);$$

$$(N_A, N_B) = (8.0, 7.0) \quad (a3); \text{ and}$$

$$(N_A, N_B) = (9.0, 8.0) \quad (a4).$$

Further, it is preferable that one of the wavelengths $\lambda_A$ and $\lambda_B$ be in a wavelength band from 390 nm to 410 nm.

According to the aspect, a laminated wave plate that can be used for Blu-ray and the like can be obtained.

An optical pickup device according to a second aspect of the invention includes: a laser light source; an objective lens condensing laser light on a recording medium; and a detector detecting light emitted after being condensed by the objective lens and being reflected by the recording medium. In the device, the laminated wave plate according to Claim 1 is disposed on an optical path between the laser light source and the objective lens.

According to the second aspect, an optical pickup device having the above-mentioned advantages can be obtained.

BRIEF DESCRIPTION OF THE DRAWINGS

The invention will be described with reference to the accompanying drawings, wherein like numbers reference like elements.

FIG. 13A is an elevational view showing a laminated wave plate, FIG. 13B is a perspective view showing the same, and FIG. 13C is a perspective view showing Poincare sphere for explaining the laminated wave plate.

DESCRIPTION OF EXEMPLARY EMBODIMENTS

An embodiment of the present invention will be described below with reference to the accompanying drawings.

Figure 1A:
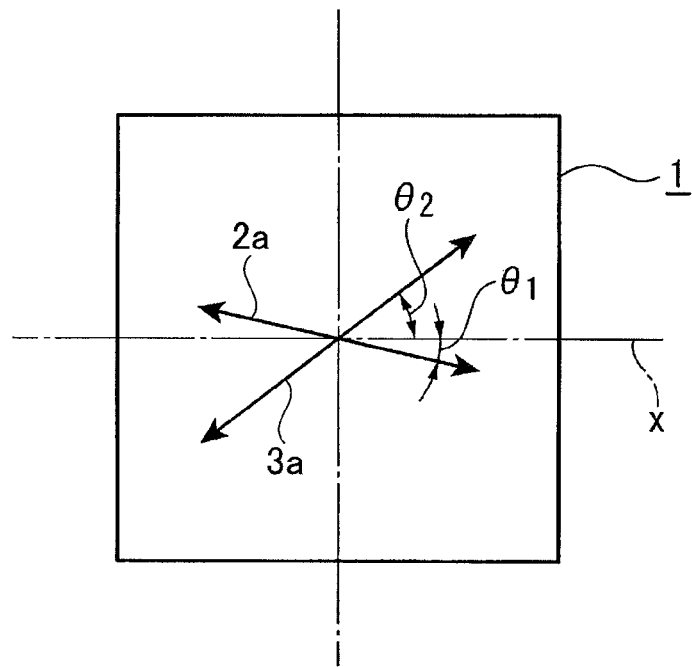
FIG. 1A is an elevational view schematically showing a laminated wave plate according to an embodiment of the invention and FIG. 1B is a lateral view showing the same.
Figure 1B:
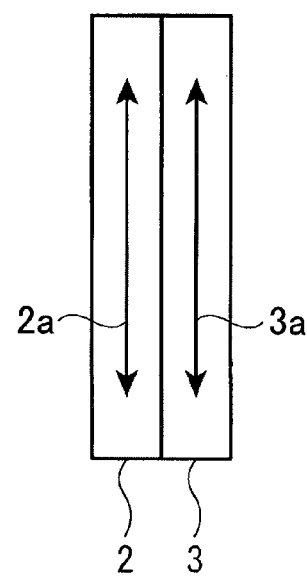

A laminated wave plate according to the embodiment of the invention will now be described. FIGS. 1A and 1B show a schematic structure of the laminated wave plate of the embodiment. FIG. 1A is an elevational view showing the laminated wave plate viewed from an incident direction of laser light, and FIG. 1B is a lateral view of the plate.

Referring to FIGS. 1A and 1B, this laminated wave plate 1 is structured such that a first wave plate 2 and a second wave plate 3 are laminated in a manner intersecting a crystal optical axis 2a of the first wave plate 2 and a crystal optical axis 3a of the second wave plate 3. The first wave plate 2 is disposed at an incident side of laser light and the second wave plate 3 is disposed at an emitting side of the laser light. The first wave plate 2 and the second wave plate 3 are made of a birefringent crystal material such as quartz crystal, lithium niobate ($LiNbO_3$), sapphire, BBO, calcite, and YVO4. The embodiment describes a case using quartz crystal for the material of the plates. The first wave plate 2 and the second wave plate 3 are bonded to each other with an adhesive, for example. Quartz crystal that is the material of the first wave plate 2 and the second wave plate 3 included in the laminated wave plate 1 is cut so as to form an angle of 90° (hereinafter, referred to as 90°Z) between a normal line of a main face (incident face) of the wave plates and the crystal optical axis (Z axis).

In terms of the laminated wave plate 1, an angle formed by a polarization plane of linearly polarized laser light incident on the laminated wave plate 1 and the crystal optical axis 2a of the first wave plate 2 is indicated as an in-plane azimuth $\theta_1$, and an angle formed by a polarization plane of the linearly polarized light and the crystal optical axis 3a of the second wave plate 3 is indicated as an in-plane azimuth $\theta_2$.

A wavelength range to which the laminated wave plate 1 of the embodiment is applicable is large, and is, for example, a wavelength range of around 785 nm used by CD, a wavelength range of around 655 nm (650 to 670 nm) used by DVD, and a wavelength range of around 405 nm (390 to 410 nm) used by Blu-ray, HDDVD, and the like.

The laminated wave plate 1 has a desired phase difference with respect to a plurality of wavelengths including two wavelengths of $\lambda_A$ and $\lambda_B$, and includes the first wave plate 2 functioning as a multimode providing a phase difference of 360° to the wavelength $\lambda_A$ and the second wave plate 3 functioning as a multimode providing a phase difference of 180° to the wavelength $\lambda_B$.

Optical variation of a polarization state of linearly polarized light that is incident on the laminated wave plate 1 will be described with reference to Poincare sphere shown in FIGS. 2 to 5B.

Figure 2:
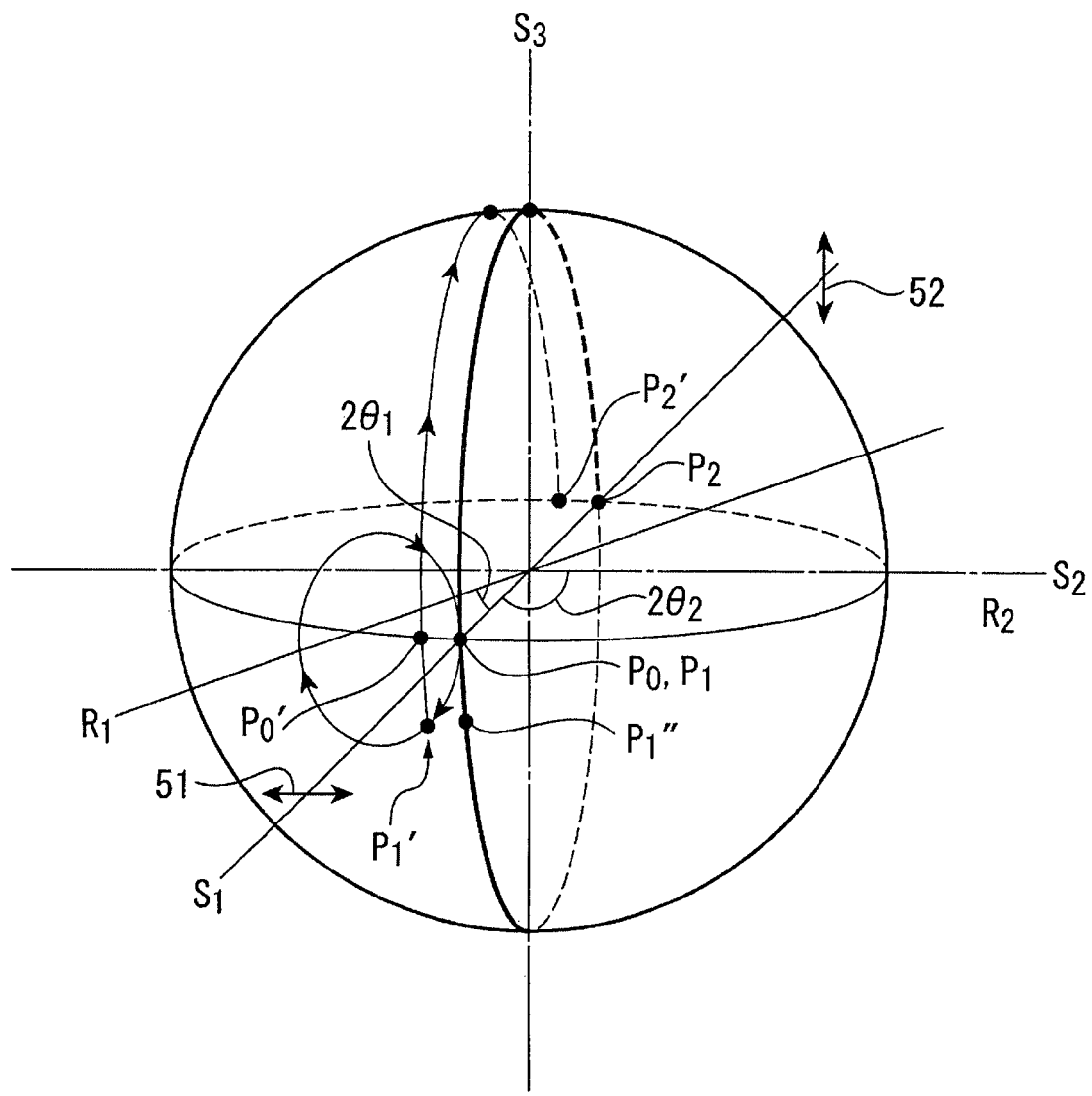
FIG. 2 is a perspective view showing Poincare sphere for explaining the laminated wave plate.

Referring to FIG. 2, linearly polarized light 51 incident from a point $P_0$ rotates as many as multiple of 360° around an optical axis $R_1$ of the first wave plate 2 as a center so as to reach a position of a point $P_1$ (point $P_0$). Further, the linearly polarized light 51 rotates as many as multiple of 180°+360° (substantively rotates by 180°) around an optical axis $R_2$ of the second wave plate 3 as a center so as to reach a point $P_2$. Then the linearly polarized light 51 is emitted as linearly polarized light 52 from an emitting face of the second wave plate 3. Since the point $P_2$ is positioned opposite to the point $P_0$ on the equator, not only the phase difference of the linearly polarized light 51 incident on the first wave plate 2 can be shifted by 180°, but also the polarization plane of the linearly polarized light can be rotated by 90°. That is, the polarization plane of the linearly polarized light 51 is orthogonal to the polarization plane of the linearly polarized light 52.

In the laminated wave plate 1, the first wave plate 2 functions as a multimode providing a phase difference of 360° to the wavelength $\lambda_B$ and the second wave plate 3 functions as a multimode providing a phase difference of 360°.

Figure 3:
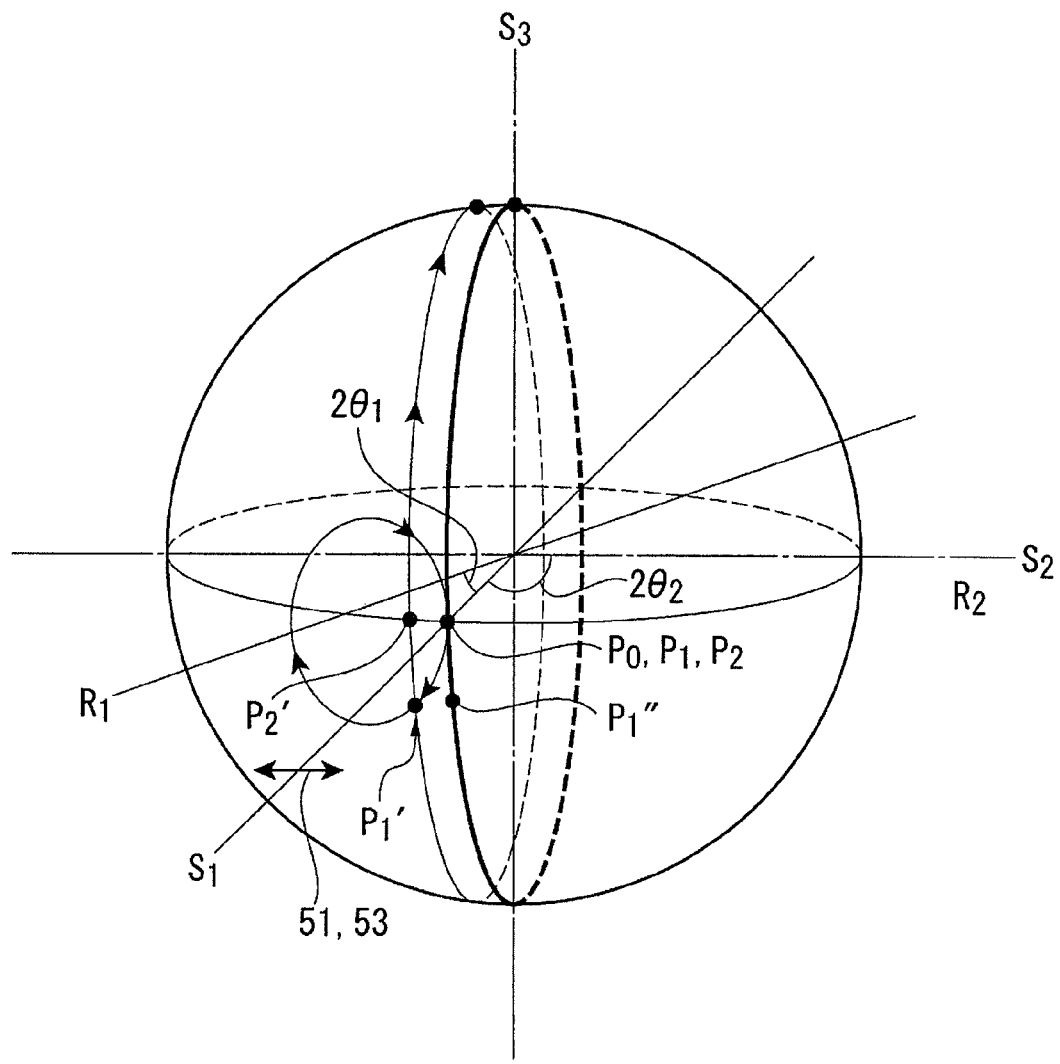
FIG. 3 is a perspective view showing Poincare sphere for explaining the laminated wave plate.

Referring to FIG. 3, the linearly polarized light 51 incident from a point $P_0$ rotates as many as multiple of 360° around the optical axis $R_1$ of the first wave plate 2 as a center so as to reach a position of a point $P_1$ (point $P_0$). Further, the linearly polarized light 51 rotates as many as multiple of 360° around the optical axis $R_2$ of the second wave plate 3 as a center so as to reach a point $P_2$ (point $P_1$, point $P_0$). The point $P_2$ is positioned on the same position of the point $P_0$ in Poincare sphere.

In the embodiment, the in-plane azimuth $\theta_1$ of the first wave plate 2 and the in-plane azimuth $\theta_2$ of the second wave plate 3 are set at predetermined values. Specifically, the in-plane azimuth $\theta_1$ and the in-plane azimuth $\theta_2$ are set so as to cancel variation of phase differences of the first wave plate 2 and the second wave plate 3 each other even when the phase differences of the first wave plate 2 and the second wave plate 3 change from the predetermined values. Therefore, wavelength dependency of the laminated wave plate 1 is suppressed and has a compensation function to generate a predetermined phase difference with respect to laser light having a plurality of wavelengths.

The linearly polarized light 51 incident from the point $P_0$ transmits through the first wave plate 2 so as to have a phase difference, and rotates around the axis $R_1$ as a rotation axis by 360°+360°×n so as to reach the point $P_1$ (point $P_0$). Further, the linearly polarized light 51 transmits through the second wave plate 3 so as to have a phase difference, and rotates around an axis $R_2$ as a rotation axis by 180°+360°×m from the point $P_0$ so as to reach the point $P_2$. Then the linearly polarized light 51 is emitted from the laminated wave plate 1 as a linearly polarized light 52. This means that the polarization plane of the linearly polarized light rotates by 90°.

Here, a case where a phase difference largely changes by shift of a wavelength from a predetermined wavelength to a short wavelength direction will be described.

The linearly polarized light 51 incident from the point $P_0$ transmits through the first wave plate 2 so as to have a phase difference. At this time, the polarized light 51 rotates excessively around the axis $R_1$ as a rotation axis by more than $360°+360°×n$ so as to reach a point $P_1'$. Then the polarized light 51 transmits through the second wave plate 3 so as to have a phase difference. At this time, the polarized light 51 excessively rotates around the axis $R_2$ as a rotation axis by more than $180°+360°×m$. However, since the origin is the point $P_1'$, if a chord $P_0P_1'$ nearly equals to a line $P_0P_1'$, a phase difference generated when the light transmits through the first wave plate 2 and the second wave plate 3 is approximately $180°$ and the light reaches a point $P_2'$ that is close to the point $P_2$. In order to make the chord $P_0P_1'$ nearly equal to the line $P_0P_1'$, an angle formed by the axis $R_1$ that is an optical axis of the first wave plate 2 and an axis $S_1$ is adjusted.

Referring to FIG. 3, the linearly polarized light 51 incident from the point $P_0$ transmits through the first wave plate 2 so as to have a phase difference, and then rotates around the axis $R_1$ as a rotation axis by $360°+360°×n$ so as to reach the point $P_1$ (point $P_0$). Then the light transmits through the second wave plate 3 so as to have a phase difference, and then rotates around the axis $R_2$ as a rotation axis by $360°+360°×m$ from the point $P_0$ so as to reach the point $P_2$. The polarization plane of the linearly polarized light 53 rotates by $180°$ so as to agree with the polarization plane of the linearly polarized light 51.

Here, a case where a phase difference largely changes by shift of a wavelength from a predetermined wavelength to a short wavelength direction will be described.

The linearly polarized light 51 incident from the point $P_0$ transmits through the first wave plate 2 so as to have a phase difference. At this time, the polarized light 51 rotates excessively around the axis $R_1$ as a rotation axis by more than $360°+360°×n$ so as to reach a point $P_1'$. Then the polarized light 51 transmits through the second wave plate 3 so as to have a phase difference. At this time, the polarized light 51 excessively rotates around the axis $R_2$ as a rotation axis by more than $360°+360°×m$. However, since the origin is the point $P_1'$, if a chord $P_0P_1'$ nearly equals to a line $P_2'P_1'$, a phase difference generated when the light transmits through the first wave plate 2 and the second wave plate 3 is approximately $360°$ and the light reaches a point $P_2'$ that is close to the point $P_2$. In order to make the chord $P_0P_1'$ nearly equal to the line $P_2'P_1'$, an angle formed by the axis $R_1$ that is an optical axis of the first wave plate 2 and an axis $S_1$ is adjusted.

That is, in the embodiment, in a case where a change of a wavelength of incident light generates a phase difference variation by $\Delta\Gamma_2$ of a phase difference $\Gamma_2$ of the second wave plate 3, the phase difference variation $\Delta\Gamma_2$ is cancelled by the phase difference variation $\Delta\Gamma_1$ of a phase difference $\Gamma_1$ of the first wave plate 2 so as to suppress the wavelength dependency of the laminated wave plate 1.

The phase difference variation of $\Delta\Gamma_2$ of the second wave plate 3 due to the change of the wavelength has a constant value that is defined by a wavelength dispersion of a material of a substrate. Therefore, the in-plane azimuth $\theta_1$ of the first wave plate 2 is adjusted, being able to make magnitude of the phase difference variation $\Delta\Gamma_1$ of the first wave plate 2 due to the change of the wavelength be variable.

The phase difference variations $\Delta\Gamma_1$ and $\Delta\Gamma_2$ express a fluctuation range in which the phase difference fluctuates respectively in a range of $\pm\Delta\Gamma_1/2$ and a range of $\pm\Delta\Gamma_2/2$ when the phase difference $\Gamma_1$ and the phase difference $\Gamma_2$ in a predetermined wavelength are set to be a center.

A relational formula between the first wave plate 2 and the second wave plate 3 is derived from the following formulas.

If a phase difference of the first wave plate 2 with respect to the wavelength $\lambda_A$ is denoted by $\Gamma_{A1}$, and a phase difference of the second wave plate 3 with respect to the wavelength $\lambda_A$ is denoted as $\Gamma_{A2}$, the phase differences $\Gamma_{A1}$ and $\Gamma_{A2}$ can be expressed as follows, because the laminated wave plate 1 functions as a half wave plate with respect to the wavelength $\lambda_A$.

$$\Gamma_{A1}=360°+360°×2N_A(N_A=1, 2, 3, \ldots \text{positive integer}) \quad (1)$$

$$\Gamma_{A2}=180°+360°×N_A(N_A=1, 2, 3, \ldots \text{positive integer}) \quad (2)$$

If a phase difference of the first wave plate 2 with respect to the wavelength $\lambda_B$ is denoted by $\Gamma_{B1}$, and a phase difference of the second wave plate 3 with respect to the wavelength $\lambda_B$ is denoted as $\Gamma_{B2}$, the phase differences $\Gamma_{B1}$ and $\Gamma_{B2}$ can be expressed as follows, because the laminated wave plate 1 functions as a 2/2 wave plate with respect to the wavelength $\lambda_B$.

$$\Gamma_{B1}=360°×2N_B(N_B=1, 2, 3, \ldots \text{positive integer}) \quad (3)$$

$$\Gamma_{B2}=360°×N_B(NB=1, 2, 3, \ldots \text{positive integer}) \quad (4)$$

In the embodiment, a birefringent difference that is a difference $(ne_A-no_A)$ between a normal beam refractive index $no_A$ and an abnormal beam refractive index $ne_A$ of the wavelength $\lambda_A$ in quartz crystal having a cutting angle of $90°$ is denoted as $\Delta n_A$, and a birefringent difference that is a difference $(ne_B-no_B)$ between a normal beam refractive index $no_B$ and an abnormal beam refractive index $ne_B$ of the wavelength $\lambda_B$ in quartz crystal having a cutting angle of $90°$ is denoted as $\Delta n_B$.

The laminated wave plate 1 is designed so as to set orders $N_A$ and $N_B$ under a condition of a formula (5).

$$N_B=(\Delta n_B/\Delta n_A)×(\lambda_A/\lambda_B)×(0.5+N_A) \quad (5)$$

Here, $N_B$ is derived by spreading the formulas (2) and (4) as follows.

The formula (2) can be expressed as a formula (2)'.

$$\Gamma_{A2}=180°+360°×N_A=\{360°/\lambda_A\}×\Delta n_A×d_2 \quad (2)'$$

Here, $d_2$ denotes a thickness dimension of the second wave plate 2.

$$\begin{aligned}d_2 &= (180° + 360°×N_A)×(\lambda_A/360°/\Delta n_A) \\ &= (0.5+N_A)×(\lambda_A/\Delta n_A)\end{aligned} \quad (2)''$$

The formula (4) can be expressed as a formula (4)'.

$$\begin{aligned}\Gamma_{B2} &= 360°×N_B \\ &= \{360°/\lambda_B\}×\Delta n_B×d_2 \\ d_2 &= (360°×N_B)×(\lambda_B/360°/\Delta n_B) \\ &= N_B×(\lambda_B/\Delta n_B)\end{aligned} \quad (4)'$$

Therefore, the formula (5) is derived from the formulas (2)' and (4)'.

$$\begin{aligned}(0.5+N_A)×(\lambda_A/\Delta n_A) &= N_B×(\lambda_B/\Delta n_B) \\ N_B &= (\lambda_A/\Delta n_A)/(\lambda_B/\Delta n_B)×(0.5+N_A) \\ &= (\Delta n_B/\Delta n_A)×(\lambda_A/\lambda_B)×(0.5+N_A)\end{aligned} \quad (5)$$

Here, if the wavelength $\lambda_A$ is 660 nm, the wavelength $\lambda_B$ is 785 nm, $\Delta n_A$ is 0.0090181, and $\Delta n_B$ is 0.0089091, a relation between $N_A$ and $N_B$ is expressed as the following table.

TABLE 1

| $N_A$ | $N_B$ |
|---|---|
| 1.0 | 1.2 |
| 2.0 | 2.1 |
| 3.0 | 2.9 |
| 4.0 | 3.7 |
| 5.0 | 4.6 |
| 6.0 | 5.4 |
| 7.0 | 6.2 |
| 8.0 | 7.1 |
| 9.0 | 7.9 |
| 10.0 | 8.7 |

Both of $N_A$ and $N_B$ are ideally integers so as to make a phase difference generated in the laminated wave plate 1 with respect to the wavelength $\lambda_A$ and the wavelength $\lambda_B$ be substantively 360° or 180°. Here, $N_A$ and $N_B$ do not become integers depending on a value set in the wavelength $\lambda_A$ and the wavelength $\lambda_B$. In such case, integers are not selected as $N_A$ and $N_B$. However, as $N_A$ and $N_B$ come closer integers, the phase difference comes closer to 360° or 180° so as to become an ideal value. Therefore, in a case where $N_A$ and $N_B$ are not integers, values closest to integers are selected for $N_A$ and $N_B$.

In the relation between $N_A$ and $N_B$ shown in Table 1, cases where $N_A$ is 2.0 and $N_B$ is 2.1, where $N_A$ is 3.0 and $N_B$ is 2.9, where $N_A$ is 8.0 and $N_B$ is 7.1, and where $N_A$ is 9.0 and $N_B$ is 7.9 are preferable. Here, fractional parts of selected $N_B$ are rounded off.

$$(N_A, N_B) = (2.0, 2.1) \approx (2.0, 2.0) \quad (a1)$$

$$(N_A, N_B) = (3.0, 2.9) \approx (3.0, 3.0) \quad (a2)$$

$$(N_A, N_B) = (8.0, 7.1) \approx (8.0, 7.0) \quad (a3)$$

$$(N_A, N_B) = (9.0, 7.9) \approx (9.0, 8.0) \quad (a4)$$

Here, a case where a coordinate $P_0$ ($P_1$) on Poincare sphere shifts to $P_1''$ when the first wave plate 2 functions as a multimode providing a phase difference of 360° to the wavelength $\lambda_A$ and the second wave plate 3 functions as a multimode providing a phase difference of 180° to the wavelength $\lambda_A$ will be considered.

Figure 4A:
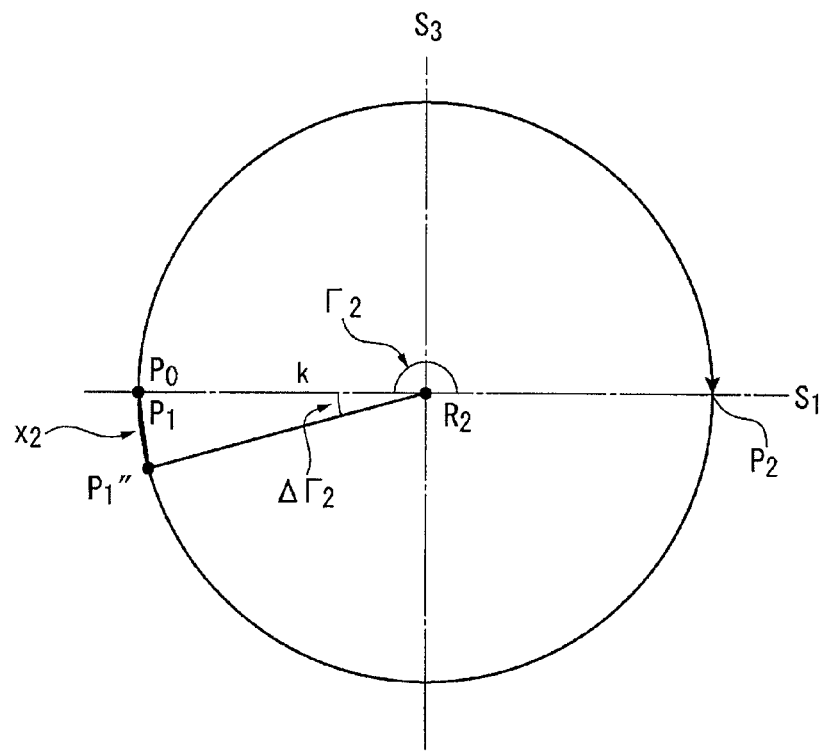
FIGS. 4A and 4B are plan views showing Poincare sphere.

FIG. 4A shows a case where the coordinate $P_0$ ($P_1$) on Poincare sphere is shifted to P1'' by the phase difference variation of $\Delta\Gamma_2$ occurring to the second wave plate 3. If the distance from $P_0$ to $P_1''$ is approximately represented by a linear line $X_2$, $\Delta\Gamma_2$ and $X_2$ satisfy a formula (6) below. Here, k denotes a radius of Poincare sphere.

$$X_2^2 = 2k^2 - 2k^2 \cos \Delta\Gamma_2 \quad (6)$$

Figure 4B:
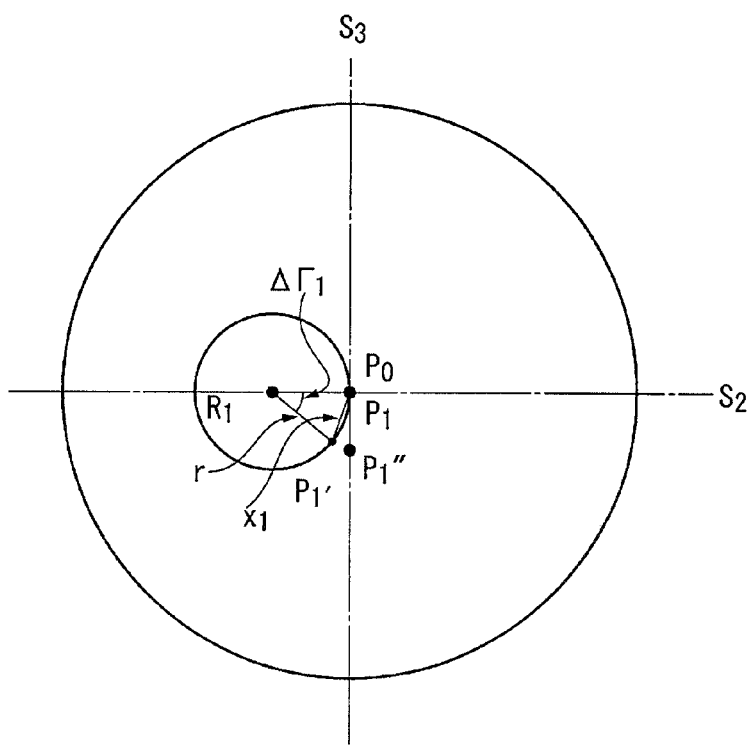

Next, similarly, FIG. 4B shows a case where the coordinate $P_0$ ($P_1$) on Poincare sphere is shifted to $P_1'$ by the phase variation $\Delta\Gamma_1$ occurring in the first wave plate 2. If the distance from $P_0$ to $P_1'$ is approximately denoted by a linear line $X_1$, $\Delta\Gamma_1$ and $X_1$ satisfy a relation of a formula (7) below. Here, r denotes a radius when the light is rotated around $R_1$ as a rotation axis by $\Delta\Gamma_1$.

$$X_1^2 = 2r^2 - 2r^2 \cos \Delta\Gamma_1 \quad (7)$$

The above relations are applicable to a laminated wave plate (refer to FIG. 3) in which the first wave plate 2 functions as a multimode providing a phase difference of 360° to the wavelength $\lambda_B$, and the second wave plate 3 functions as a multimode providing a phase difference of 360°.

Figure 5A:
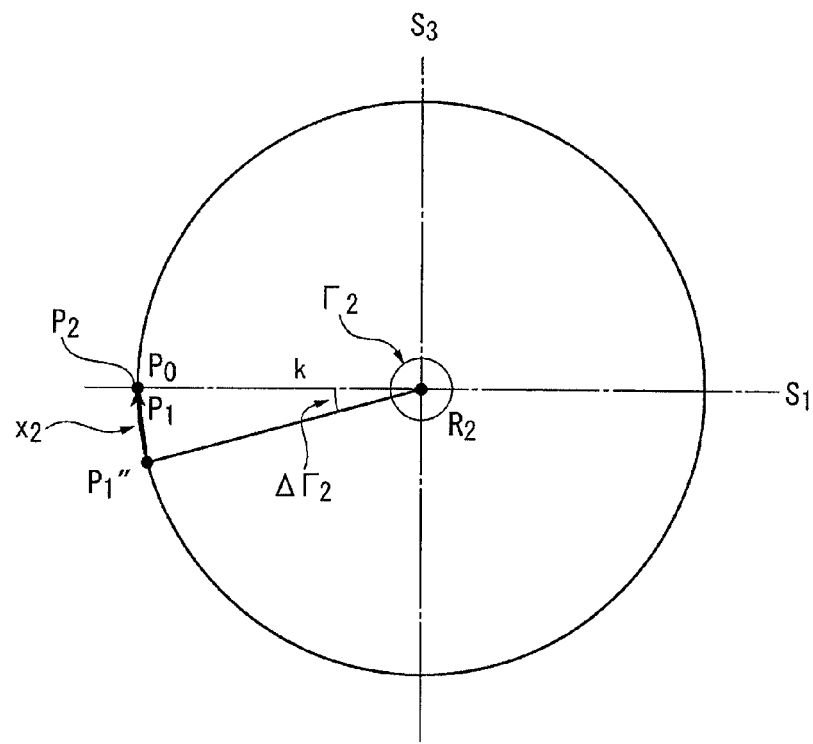
FIGS. 5A and 5B are plan views showing Poincare sphere.

FIG. 5A shows a case where the coordinate $P_0$ ($P_1$) on Poincare sphere is shifted to $P_1''$ by the phase difference variation of $\Delta\Gamma_2$ occurring to the second wave plate 3. If the distance from $P_0$ to $P_1''$ is approximately represented by a linear line $X_2$, $\Delta\Gamma_2$ and $X_2$ satisfy above-mentioned the formula (6).

Figure 5B:
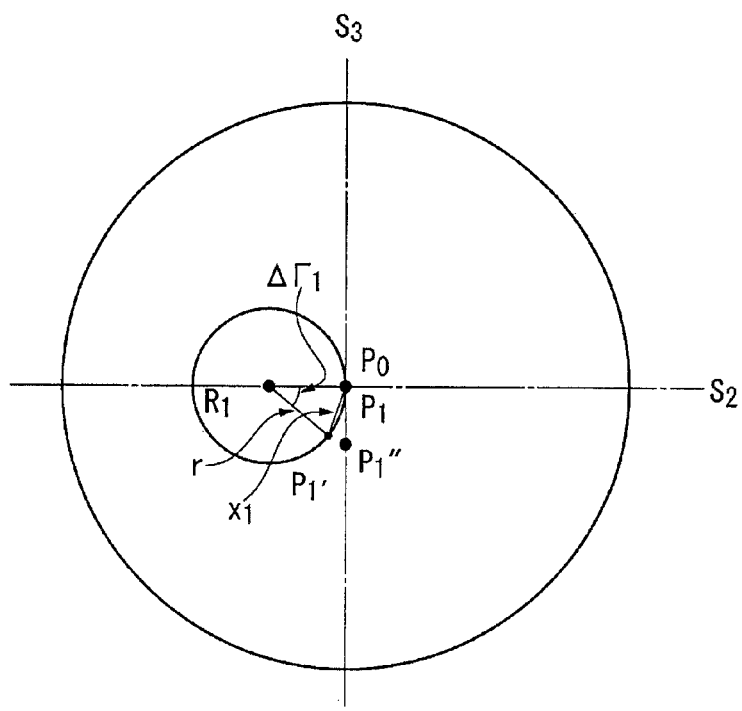

Next, similarly, FIG. 5B shows a case where the coordinate $P_0$ ($P_1$) on Poincare sphere is shifted to $P_1'$ by the phase difference variation $\Delta\Gamma_1$ occurring to the first wave plate 2. If the distance from $P_0$ to $P_1'$ is approximately represented by a linear line $X_1$, $\Delta\Gamma_1$ and $X_1$ satisfy a relation of the formula (7) mentioned above.

In addition, r can be expressed by a formula (8) below using the in-plane azimuth $\theta_1$ of the first wave plate 2.

$$r^2 = 2k^2 - 2k^2 \cos 2\theta_1 \quad (8)$$

Further, a formula (9) can be derived from the formulas (7) and (8).

$$X_1^2 = 4k^2(1-\cos 2\theta_1)(1-\cos \Delta\Gamma_1) \quad (9)$$

Here, $X_1$ needs to nearly equal to $X_2$ so as to cancel the phase difference variations of the first wave plate 2 and the second wave plate 3 each other.

From the formulas (6) and (9), a formula (10) below is derived.

$$X_1^2 = X_2^2$$

$$2k^2 - 2k^2 \cos \Delta\Gamma_2 = 4k^2(1-\cos 2\theta_1)(1-\cos \Delta\Gamma_1) \quad (10)$$

In the formula (10), if k is normalized, a formula (11) is derived.

$$1-\cos \Delta\Gamma_2 = 2(1-\cos 2\theta_1)(1-\cos \Delta\Gamma_1)$$

$$2(1-\cos 2\theta_1) = (1-\cos \Delta\Gamma_2)/(1-\cos \Delta\Gamma_1)$$

$$1-\cos 2\theta_1 = (1-\cos \Delta\Gamma_2)/\{2\times(1-\cos \Delta\Gamma_1)\}$$

$$\cos 2\theta_1 = 1-(1-\cos \Delta\Gamma_2)/\{2\times(1-\cos \Delta\Gamma_1)\} \quad (11)$$

Here, since the first wave plate 2 and the second wave plate 3 are made of a substrate material having the same wavelength dispersion, if a formula $m = \Gamma_{A1}/\Gamma_{A2}$ is satisfied, a formula (12) can be derived.

$$\Delta\Gamma_1 = m \times \Delta\Gamma_2 \quad (12)$$

If the formula (12) is assigned to the formula (11), a formula (13) is derived.

$$\cos 2\theta_1 = 1-(1-\cos \Delta\Gamma_2)/\{2\times(1-\cos(m\times\Delta\Gamma_2))\} \quad (13)$$

The formula (13) shows that the in-plane azimuth $\theta_1$ of the first wave plate 2 is defined by the phase difference variation $\Delta\Gamma_2$ occurring to the second wave plate 3.

Specific parameters of the first wave plate 2 and the second wave plate 3 are calculated from the above formulas. The formula (a1) is employed among the values of ($N_A$, $N_B$) calculated in the above.

$$(N_A, N_B) = (2.0, 2.0) \quad (a1)$$

From the formula (1), the phase difference $\Gamma_{A1}$ of the wavelength $\lambda_A$ on the first wave plate 2 is derived as $$\Gamma_{A1} = 360° + 360° \times 2 \times 2.0 = 360° + 360° \times 4 = 1800°.$$

The phase difference $\Gamma_{A2}$ of the wavelength $\lambda_A$ on the second wave plate 3 is derived as $$\Gamma_{A2} = 180° + 360° \times 2.0 = 900°.$$

Under these conditions, parameters are calculated for a case where the laminated wave plate 1 functions as a half wave plate in a wavelength range from 390 nm to 410 nm.

The phase difference $\Gamma_{A1}$ of the wavelength $\lambda_A$ on the first wave plate 2 is 1800°, and the phase difference $\Gamma_{A2}$ of the wavelength $\lambda_A$ on the second wave plate 3 is 900°, so that the following formula is derived.

$$m = \Gamma_{A1}/\Gamma_{A2} = 1800°/900° = 2$$

The substrate material of the laminated wave plate 1 is quartz crystal having a cutting angle of 90°Z. In a case of the wavelength $\lambda_A$ of 660 nm±25 nm (660 nm is the central wavelength), the phase difference variation $\Delta\Gamma_2$ of the second wave plate 3 is expressed as a formula (14) with respect to the central wavelength.

$$\pm\Delta\Gamma_2/2 = \pm 45° \quad (14)$$

Therefore, if m=2 and $\Delta\Gamma_2$=90° are assigned to the formula (13), the in-plane azimuth $\theta_1$ of the first wave plate 2 is derived as follows.

$$\begin{aligned}
\cos 2\theta_1 &= 1 - (1 - \cos\Delta\Gamma_2)/\{2 \times (1 - \cos(m \times \Delta\Gamma_2))\} \\
&= 1 - (1 - \cos 90°)/\{2 \times (1 - \cos(2 \times 90°))\} \\
&= 1 - 1/\{2 \times (1 - (-1))\} \\
&= 1 - 1/4 \\
&= 3/4
\end{aligned}$$

$$\begin{aligned}
\theta_1 &= 1/2 \times \cos^{-1}(3/4) \\
&= 20.70° \\
&\approx 21°
\end{aligned}$$

Referring to FIG. 1A, the counterclockwise direction of the in-plane azimuth with respect to a parallel axis x is positive and the clockwise direction of the same is negative, so that $\theta_1$ is approximately −21°.

The in-plane azimuth $\theta_2$ of the second wave plate 3 is 45°.

Therefore, in the range of the wavelength $\lambda_A$ from 390 nm to 410 nm, designing conditions approximately derived are the following.

$\Gamma_{A1}$=1800°

$\Gamma_{A2}$=900°

$\theta_1$=−21°

$\theta_2$=45°

Since these designing conditions include approximations, it is preferable to optimize them by performing further detailed calculations. The detailed calculations can be performed by using Jones vector or Mueller matrix. A calculation using Mueller matrix is performed here.

First, the calculation method will be described in brief. A polarization state after linearly polarized light is transmitted through two wave plates can be expressed by Mueller matrix.

$$E = R_2 \cdot R_1 \cdot I \quad (15)$$

Here, I is a vector indicating a polarization state of incident light, and E is a vector indicating a polarization state of emitted light. $R_1$ is a Mueller matrix for the first wave plate 2 of the laminated wave plate 1 and $R_2$ is a Mueller matrix for the second wave plate 3, being respectively expressed by formulas (16) and (17) below.

By determining the high mode orders n1 and n2 of the first wave plate 2 and the second wave plate 3, and setting the respective phase differences Γ1 and Γ2 and the optical axis orientations $\theta_1$ and $\theta_2$, the Muller matrices $R_1$ and $R_2$ are evaluated with the formulas (16) and (17). Then, if a polarization state I of the incident light is set, a polarization state E of the emitted light can be calculated with the formula (15).

The polarized state E of the emitted light is expressed by a formula (18) below.

$$E = \begin{pmatrix} S_{01} \\ S_{11} \\ S_{21} \\ S_{31} \end{pmatrix} \quad (18)$$

Matrix elements of E, $S_{01}$, $S_{11}$, $S_{21}$, $S_{31}$ are called as Stokes parameters and indicate polarization states. By using these Stokes parameters, a phase difference Γ is expressed as a formula (19) below.

$$\Gamma = \tan^{-1} \frac{S_{31}}{\sqrt{S_{11}^2 + S_{21}^2}} \quad (19)$$

Accordingly, a phase difference can be calculated by using the formula (19).

Figure 6:
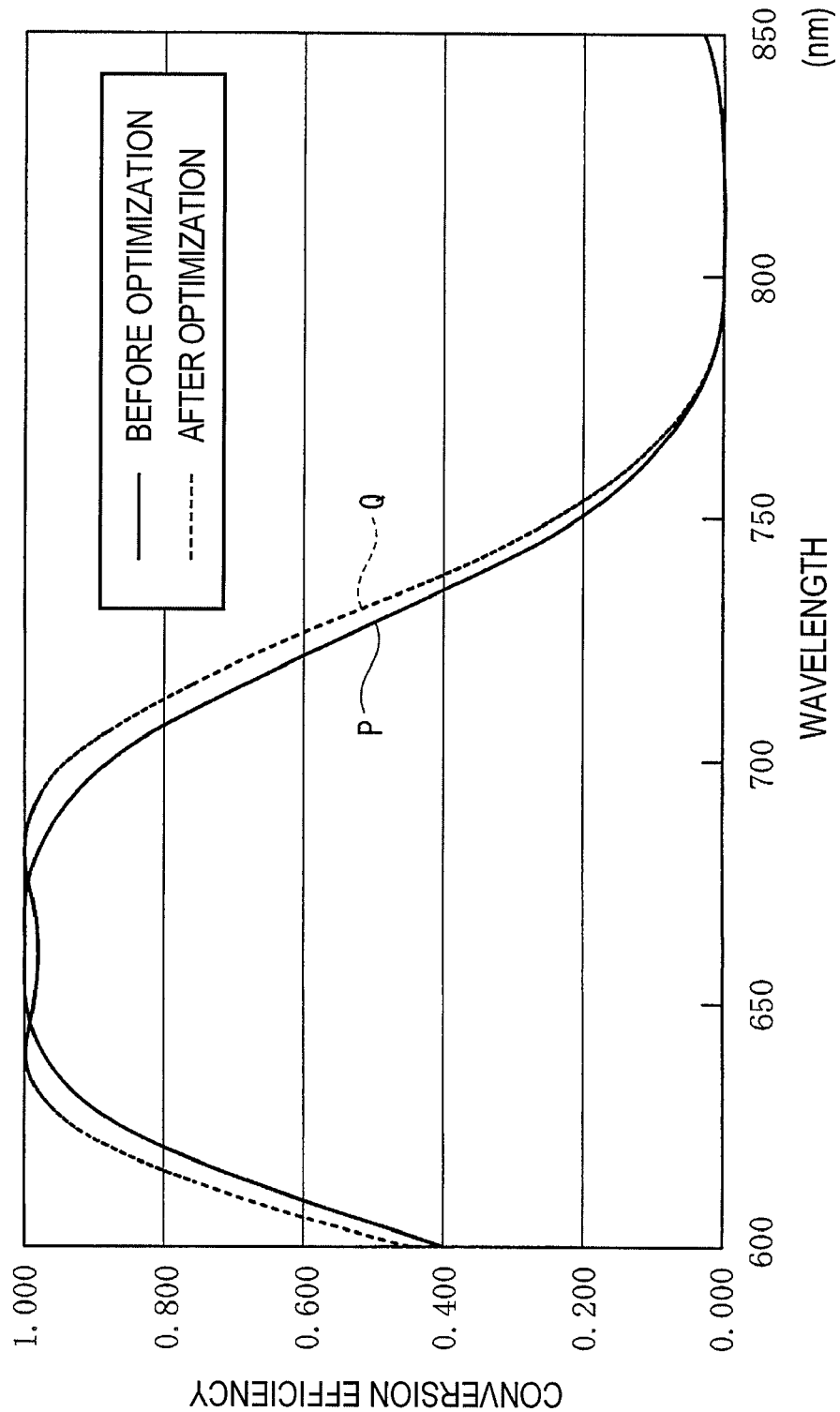
FIG. 6 is a graph showing a relation between a wavelength and exchange efficiency before and after optimization.

In the present embodiment, optimization is conducted so as to suit the designing conditions approximately derived to those for the real use through the optimizing process (calculating method) described above. A state of the optimization is shown in a graph of FIG. 6. In FIG. 6, a state before the optimization is denoted by P, and a state after the optimization is denoted by Q. In the graph of FIG. 6, an abscissa axis indicates a wavelength (nm), and a longitudinal axis indicates conversion efficiency.

Designing conditions of phase differences $\Gamma_{A1}$ and $\Gamma_{A2}$ and in-plane azimuths $\theta_1$ and $\theta_2$ before and after optimization are the following.

TABLE 2

| | P(before optimization) | Q(after optimization) |
|---|---|---|
| $\Gamma_{A1}$ | 1800° | 1800° |
| $\Gamma_{A2}$ | 900° | 900° |
| $\theta_1$ | −21° | −20° |
| $\theta_2$ | 45° | 41° |

Conversion efficiency in the wavelength of 660 nm is 1 (100%) before the optimization. However, in the real use, if $$R_1 = \begin{bmatrix} 1 & 0 & 0 & 0 \\ 0 & 1-(1-\cos\Gamma_1)\sin^2 2\theta_1 & (1-\cos\Gamma_1)\sin 2\theta_1\cos 2\theta_1 & -\sin\Gamma_1\sin 2\theta_1 \\ 0 & (1-\cos\Gamma_1)\sin 2\theta_1\cos 2\theta_1 & 1-(1-\cos\Gamma_1)\cos^2 2\theta_1 & \sin\Gamma_1\cos 2\theta_1 \\ 0 & \sin\Gamma_1\sin 2\theta_1 & -\sin\Gamma_1\cos 2\theta_1 & \cos\Gamma_1 \end{bmatrix} \quad (16)$$

$$R_2 = \begin{bmatrix} 1 & 0 & 0 & 0 \\ 0 & 1-(1-\cos\Gamma_2)\sin^2 2\theta_2 & (1-\cos\Gamma_2)\sin 2\theta_2\cos 2\theta_2 & -\sin\Gamma_2\sin 2\theta_2 \\ 0 & (1-\cos\Gamma_2)\sin 2\theta_2\cos 2\theta_2 & 1-(1-\cos\Gamma_2)\cos^2 2\theta_2 & \sin\Gamma_2\cos 2\theta_2 \\ 0 & \sin\Gamma_2\sin 2\theta_2 & -\sin\Gamma_2\cos 2\theta_2 & \cos\Gamma_2 \end{bmatrix} \quad (17)$$

wavelength variation of laser light caused by a temperature drift of a semiconductor laser is considered, for example, it is preferable that high conversion efficiency can be maintained even in a case where the wavelength is changed. Therefore, the optimization is conducted so as to widen a wavelength range in which high conversion efficiency can be maintained.

Figure 7:
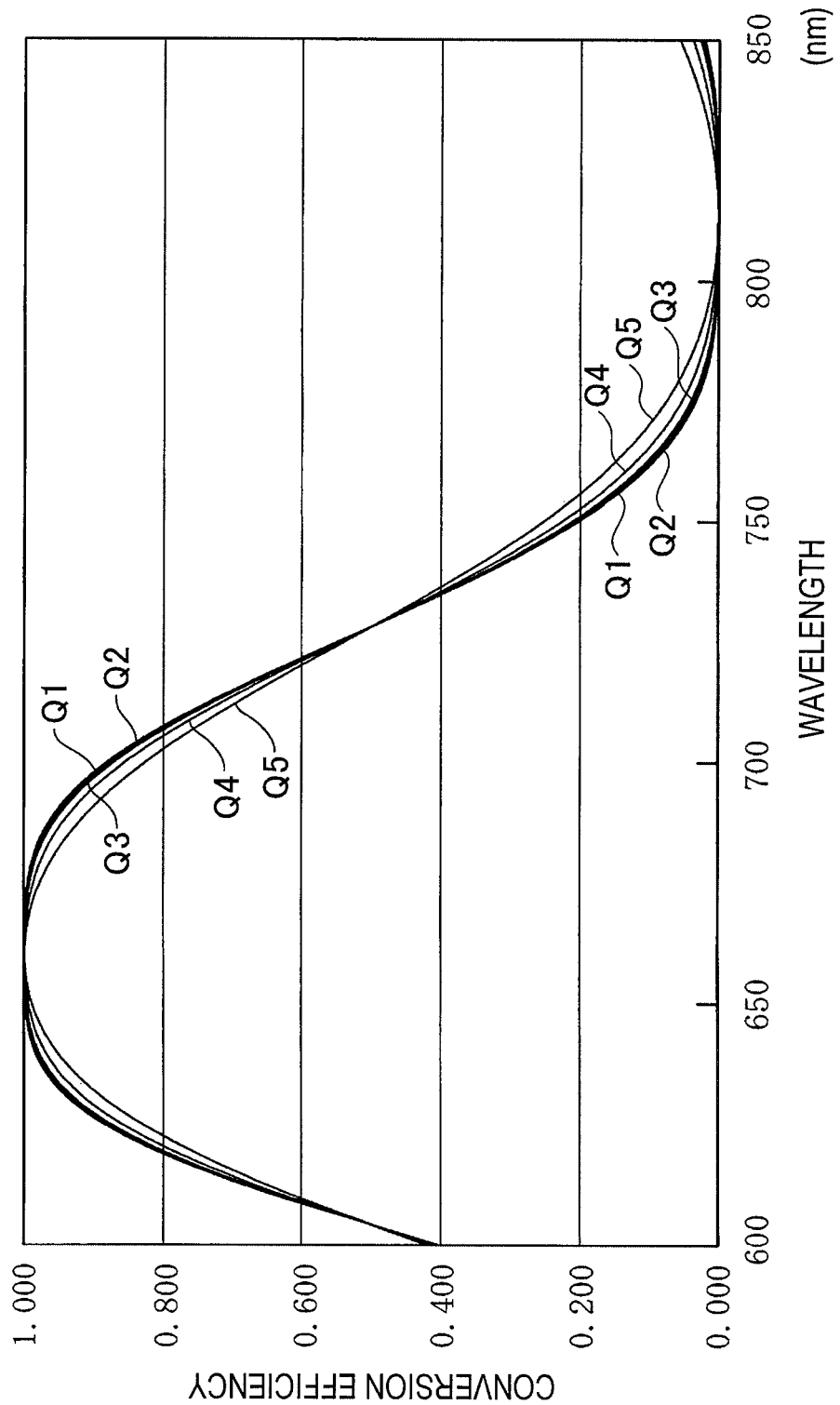
FIG. 7 is a graph showing a relation between a wavelength and conversion efficiency after optimization.
Figure 8:
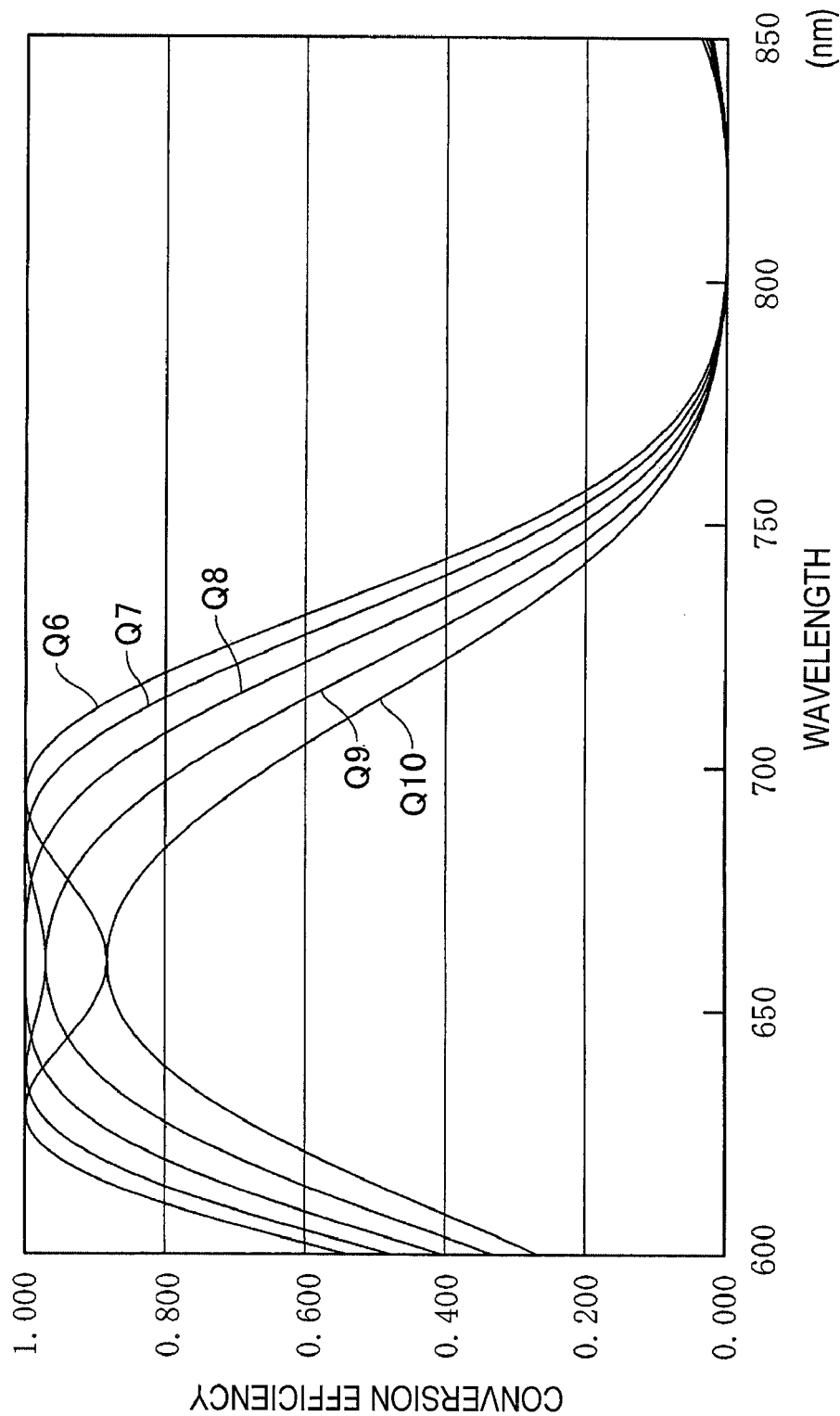
FIG. 8 is a graph showing a relation between a wavelength and conversion efficiency after optimization.

Note that a characteristic Q after the optimization shown in FIG. 6 is only an example of optical characteristics of the laminated wave plate 1 according to the embodiment, and suitable characteristics can be obtained by adjusting in-plane azimuths in a range of $\theta_1=-21°\pm10°$ and $\theta_2=45°\pm10°$ as shown in FIGS. 7 and 8, for example.

Referring to FIG. 7, Q1 to Q5 show conversion efficiency in a case where a combination of $(\theta_1, \theta_2)$ is set to have values in TABLE 3. In the graph of FIG. 7, an abscissa axis indicates a wavelength (nm), and a longitudinal axis indicates conversion efficiency.

TABLE 3

| | $\theta_1$ | $\theta_2$ |
|---|---|---|
| Q1 | −11° | 45° |
| Q2 | −17° | 45° |
| Q3 | −21° | 45° |
| Q4 | −25° | 45° |
| Q5 | −31° | 45° |

Referring to FIG. 8, Q6 to Q10 show conversion efficiency in a case where a combination of $(\theta_1, \theta_2)$ is set to have values in TABLE 4. In the graph of FIG. 8, an abscissa axis indicates a wavelength (nm), and a longitudinal axis indicates conversion efficiency.

TABLE 4

| | $\theta_1$ | $\theta_2$ |
|---|---|---|
| Q6 | −21° | 35° |
| Q7 | −21° | 40° |
| Q8 | −21° | 45° |
| Q9 | −21° | 50° |
| Q10 | −21° | 55° |

A combination of the in-plane azimuths $\theta_1$ and $\theta_2$ is adequately selected and optimized based on a required specification or a technical idea of a designer. The combination of the in-plane azimuths $\theta_1$ and $\theta_2$ may be adjusted based on a width of a wavelength band, which is used, so as to satisfy a conversion efficiency of 0.8 or more in the wavelength $\lambda_A$ of 660±20 (nm), for example, or may be set based on a conversion efficiency so as to satisfy a conversion efficiency of 1.0 in the wavelength $\lambda_A$ of 660 (nm), for example. An example of an optical pickup device including the laminated wave plate 1 of the embodiment will now be described with reference to FIG. 9.

This optical pickup device 10 of the embodiment corresponds to two wavelengths, and is compatible with CD and DVD, for example. The optical pickup device of the embodiment may be used as an optical pickup device compatible with DVD and Blu-ray or a device compatible with CD and Blu-ray.

Figure 9:
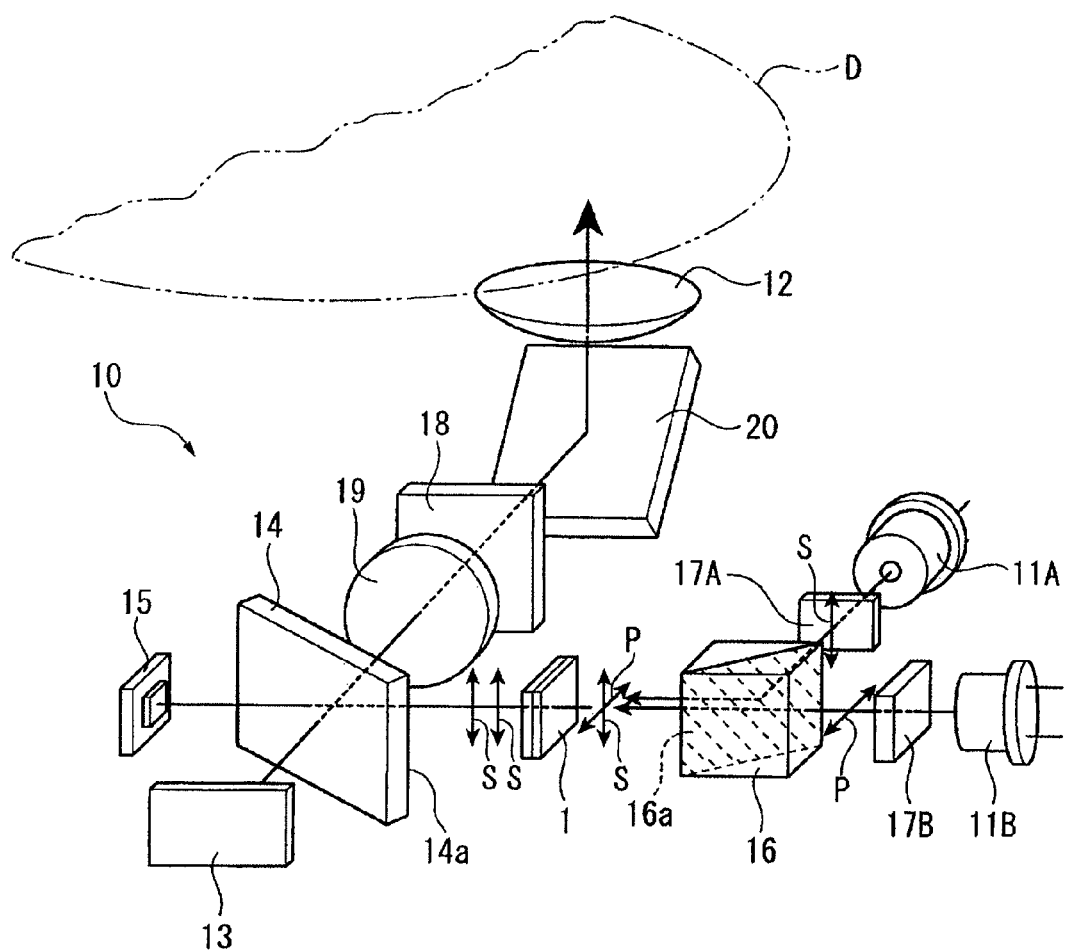
FIG. 9 is a perspective view schematically showing an optical pickup device according to the embodiment of the invention.

Referring to FIG. 9, the optical pickup device 10 includes a laser light source 11A for CD, a laser light source 11B for DVD, an objective lens 12, and a detector 13. The objective lens 12 condenses laser light emitted from the laser light sources 11A and 11B on an optical disk D that is a recording medium. The detector 13 detects light emitted after being condensed by the objective lens 12 and then reflected by the optical disk D.

Between the detector 13 and the objective lens 12 and on an optical path from the laser light sources 11A and 11B to the objective lens 12, a half mirror 14 is disposed. The half mirror 14 sends a part of laser light emitted from the laser light sources 11A and 11B to the objective lens 12 and transmits a part of the rest of the laser light. The laser light that is transmitted through the half mirror 14 is monitored by a front monitor 15.

Between the half mirror 14 and the laser light sources 11A and 11B, a polarized light beam splitter (hereinafter, referred to as PBS) 16 is disposed. Between the PBS 16 and the laser light source 11A for CD, a grating 17A for CD is disposed, while between the PBS 16 and the laser light source 11B, a grating 17B for DVD is disposed. Between the PBS 16 and the half mirror 14, the laminated wave plane 1 according to the embodiment is disposed. The gratings 17A and 17B are diffraction gratings.

Between the half mirror 14 and the objective lens 12, a collimator lens 19 and a raised mirror 20 are disposed. Between the collimator lens 19 and the raised mirror 20, a quarter wave plate 18 is disposed.

A function of the laminated wave plate 1 in the optical pickup device 10 will be described. On an inclined plane 16a of the PBS 16, a polarized light separating film having an optical characteristic by which p-polarized light is transmitted and s-polarized light is reflected is formed. S-polarized laser light and p-polarized laser light are respectively emitted from the laser light source 11A (for CD) and the laser light source 11B (for DVD). The p-polarized laser light emitted from the laser light source 11B (for DVD) is transmitted through the inclined plane 16a of the PBS 16, and the s-polarized laser light emitted from the laser light source 11A (for CD) is reflected at the inclined plane 16a of the PBS 16 so as to have the same axis as that of a light path of the laser light for DVD.

On a reflecting face 14a of the half mirror 14, an optical thin film having an optical characteristic by which p-polarized light is transmitted and s-polarized light is reflected is formed. If the p-polarized laser light for DVD transmitting through the PBS 16 is incident on the laminated wave plate 1, a phase difference of 180° is generated, rotating the polarization plane by 90°. Thus the p-polarized laser light is converted into s-polarized laser light so as to reach the half mirror 14. The laser light converted into the s-polarized light is securely reflected at the reflecting face 14a of the half mirror 14 so as to be led to the light disk D. Since the laser light for CD reflected at the PBS 16 is originally s-polarized light, the polarization plane thereof does not need to be rotated. The phase difference generated when the laser light transmits through the laminated wave plane 1 is 2π. The light is emitted from the laminated wave plate 1 in a manner maintaining the s-polarization and reflected at the reflecting face 14a of the half mirror 14 so as to be led to the optical disk D.

Next, another example of an optical pickup device that is different from the optical pickup device 10 shown in FIG. 9 will be described with reference to FIGS. 10A and 10B.

Figure 10A:
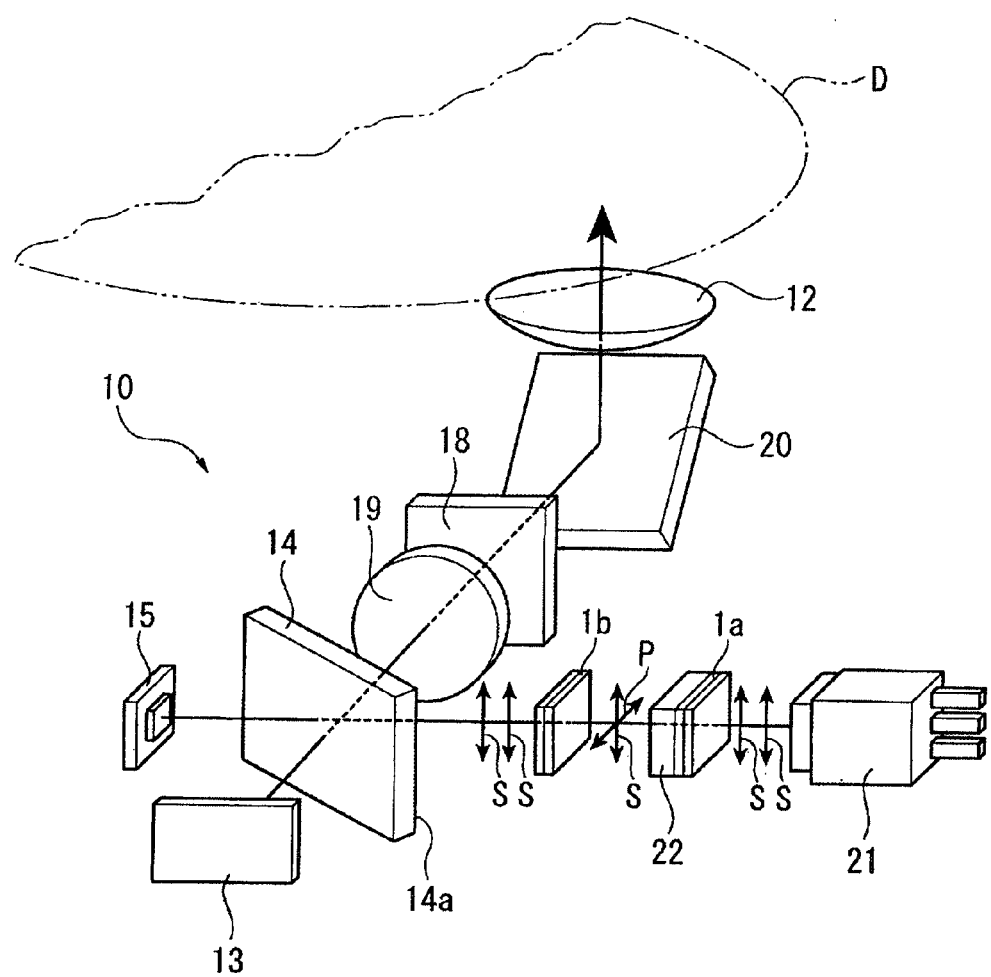
FIG. 10A is a perspective view schematically showing an optical pickup device different from that of FIG. 9.
Figure 10B:
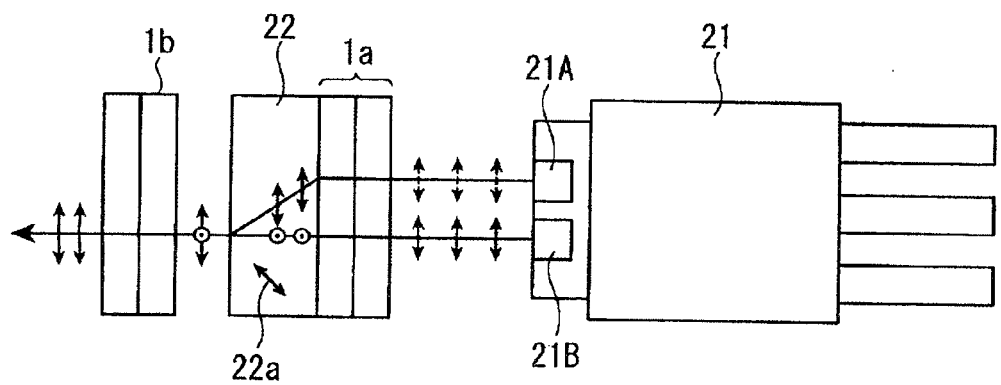
FIG. 10B is an elevational view showing vicinity of a laser light source.

This optical pickup device 10 shown in FIGS. 10A and 10B is compatible with CD and DVD, for example, as is the case with the optical pickup device 10 shown in FIG. 9.

Referring to FIG. 10A, the optical pickup device 10 is provided with a laser light source 21 in which a laser light source for CD and a laser light source for DVD are integrated. Laser light emitted from the laser light source 21 is emitted toward the half mirror 14.

The laser light source 21 includes an irradiating part 21A emitting laser light for CD and an irradiating part 21B emitting laser light for DVD that are provided side by side. Laser light emitted from these irradiating parts 21A and 21B are corrected to have optical paths having the same axes by an optical path correcting element 22 so as to be emitted toward the half mirror 14.

The optical path correcting element 22 is made of a birefringent material such as quartz crystal. Polarized light having a polarization plane orthogonal to an optical axis of the biregringent material is called a normal ray, while polarized light having a polarization plane parallel to the optical axis is called an abnormal ray.

The laser light emitted from the irradiating part 21A (for CD) and the irradiating part 21B (for DVD) are linearly s-polarized light of which polarization planes face the same direction and the laser light are abnormal rays with respect to the optical axis of the optical path correcting element 22. Therefore, the laser light are refracted as-is at the optical path correcting element 22 so as to have optical paths having different axes. Therefore, a laminated wave plate 1a according to the embodiment is disposed between the optical path correcting element 22 and the laser light source 21 so as to rotate the polarization plane of one of the linearly polarized laser light by 90°, making the light be a normal ray with respect to the optical path correcting element 22.

Accordingly, the s-polarized laser light for DVD emitted from the irradiating part 21B becomes to have a phase difference of π generated at the laminated wave plate 1a, which is laminated on the optical path correcting element 22, and to have a polarization plane rotated by 90° so as to be p-polarized light, being incident on the optical path correcting element 22. Since the p-polarized laser light is a normal ray with respect to the optical axis 22a of the optical path correcting element 22, the laser light is emitted from the optical path correcting element 22 in a manner maintaining the optical path without being refracted so as to reach the half mirror 14.

On the other hand, the s-polarized laser light for CD emitted from the irradiating part 21A becomes to have a phase difference of 2π generated at the laminated wave plate 1a, which is laminated on the optical path correcting element 22, and then the light is emitted from the laminated wave plate 1a in a manner maintaining the s-polarization without varying the polarization plane so as to be incident on the optical path correcting element 22. Since the s-polarized laser light is an abnormal ray with respect to the optical axis 22a, the laser light is refracted at the optical path correcting element 22 and then is emitted from the optical path correcting element 22 in a manner having the same axis as that of the optical path of the laser light for DVD so as to reach the half mirror 14.

Here, since the optical thin film having an optical characteristic to transmit p-polarized light and reflect s-polarized light is formed on the reflecting face 14a of the half mirror 14 as described above, the p-polarized laser light for DVD is transmitted as-is at the reflecting face 14a without being reflected. Therefore, another laminated wave plate 1b according to the embodiment is disposed on the opposite position of the position between the optical path correcting element 22 and the laser light source 21 across the optical path correcting element 22 so as to convert the p-polarized laser light for DVD to the s-polarized laser light, leading the light to the half mirror 14. The s-polarized laser light for CD emitted from the optical path correcting element 22 is emitted from the laminated wave plate 1b in a manner maintaining the s-polarization without rotating its polarization plane at the laminated wave plate 1b so as to reach the half mirror 14. Since FIGS. 10A and 10B show the laminated wave plates at two positions, the laminated wave plate 1a and the laminated wave plate 1b are described separately. However, they have the same structure as the laminated wave plate 1.

Thus, the embodiment has the following advantageous effects.

The laminated wave plate 1 that corresponds to two wavelengths of $\lambda_A$ and $\lambda_B$ and includes the first wave plate 2 disposed at the incident side and the second wave plate 3 disposed at the emitting side which are laminated in a manner making the optical axes thereof intersect with each other is set to satisfy the following formulas (1) to (5) when the phase difference of the wavelength $\lambda_A$ at the first wave plate 2 is indicated as $\Gamma_{A1}$, the phase difference of the wavelength $\lambda_A$ at the second wave plate 3 is indicated as $\Gamma_{A2}$, the phase difference of the wavelength $\lambda_B$ at the first wave plate 2 is indicated as $\Gamma_{B1}$, the phase difference of the wavelength $\lambda_B$ at the second wave plate 3 is indicated as $\Gamma_{B2}$, an in-plane azimuth of the first wave plate 2 is indicated as $\theta_1$, an in-plane azimuth of the second wave plate 3 is indicated as $\theta_2$, a difference ($ne_A - no_A$) between the normal ray refracting rate $no_A$ and the abnormal ray refracting rate $ne_A$ is indicated as $\Delta n_A$, and a difference ($ne_B - no_B$) between the normal ray refracting rate $no_B$ and the abnormal ray refracting rate $ne_B$ is indicated as $\Delta n_B$, under the conditions: the inplane azimuth $\theta_1$ of the first wave plate 2 of $-21°$, and the inplane azimuth $\theta_2$ of the second wave plate 3 of 45°.

$$\Gamma_{A1} = 360° + 360° \times 2N_A \quad (1)$$

$$\Gamma_{A2} = 180° + 360° \times N_A \quad (2)$$

$$\Gamma_{B1} = 360° \times 2N_B \quad (3)$$

$$\Gamma_{B2} = 360° \times N_B \quad (4)$$

$$N_B = (\Delta n_B / \Delta n_A) \times (\lambda_A / \lambda_B) \times (0.5 + N_A) \quad (5)$$

Therefore, even if the wavelength of incident light really used is shorter than the predetermined wavelength $\lambda_A$ and $\lambda_B$, the short amount of phase difference is cancelled, while, even if the wavelength of the light really used is longer than the predetermined wavelength $\lambda_A$ and $\lambda_B$, the long amount of phase difference is cancelled. Therefore, the wavelength of light really emitted is not shifted from the predetermined value.

Accordingly, if the laminated wave plate 1 is used for a pickup device compatible between CD and DVD or a pickup device compatible between DVD and Blu-ray, wavelength of emitted light is not shifted even if the wavelength of the light which is used is shifted with respect to the predetermined value (set wavelength). Therefore, accuracy in reading and writing information by a recording and regenerating device such as CD, DVD, and Blu-ray is improved.

It should be noted that the present invention is not limited to the aforementioned embodiment but includes various modifications or improvements within a scope of a purpose of this invention.

Figure 11A:
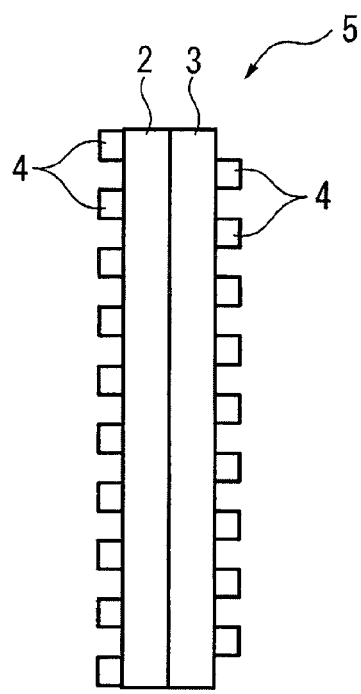
FIGS. 11A and 11B are schematic views showing a laminated wave plate according to a modification of the present invention.
Figure 11B:
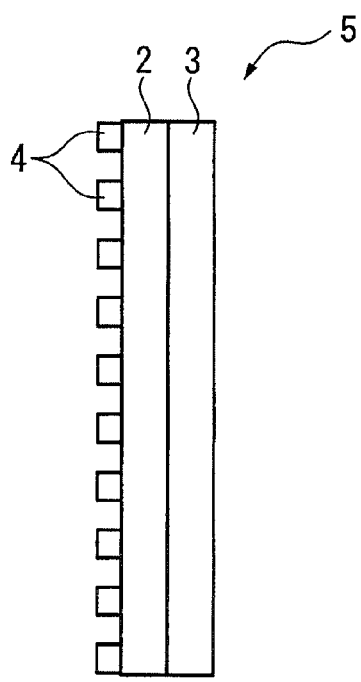
Figure 12:
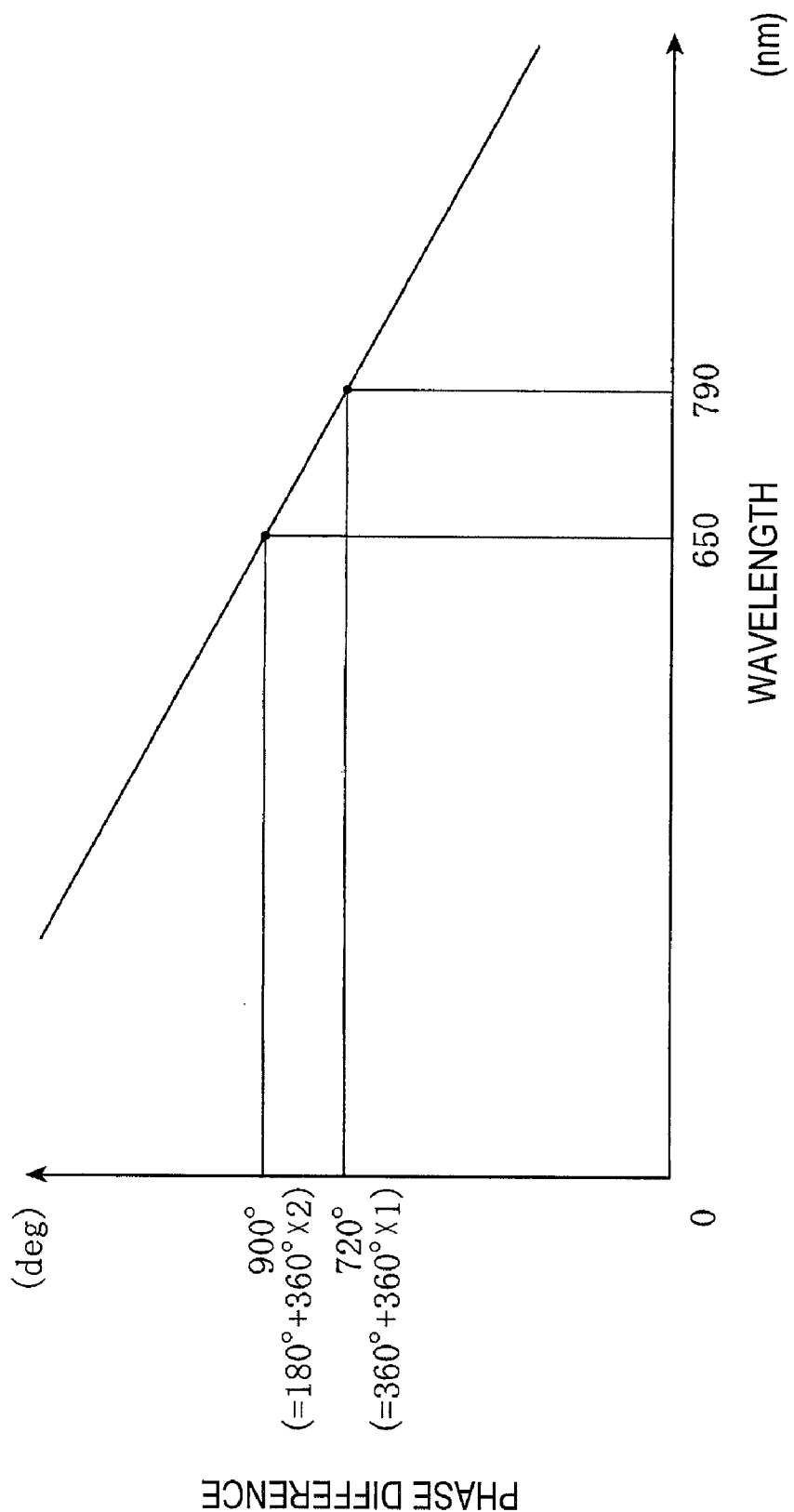
FIG. 12 is a graph showing a relation between a wavelength and a phase difference for explaining a related art issue.
Figures 13A, 13B:
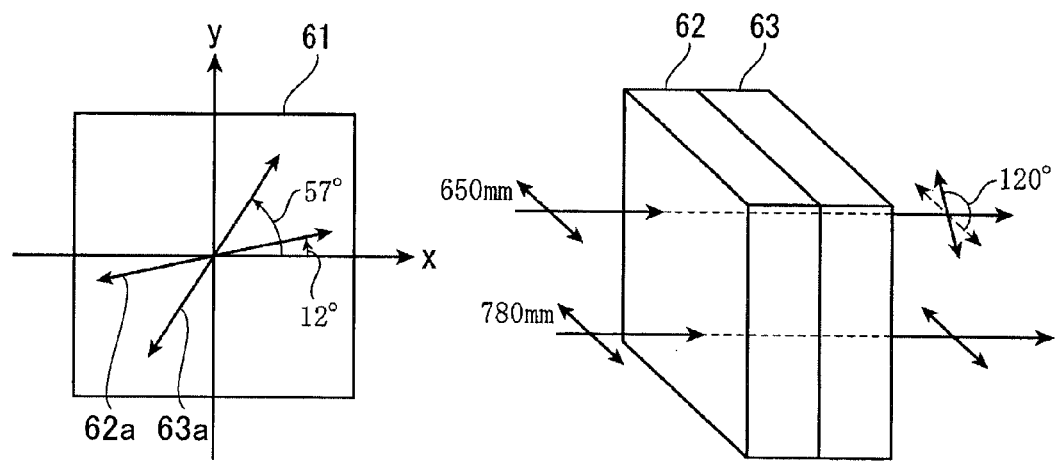
FIGS. 13A to 13C are diagrams for explaining a related art issue.
Figure 13C:
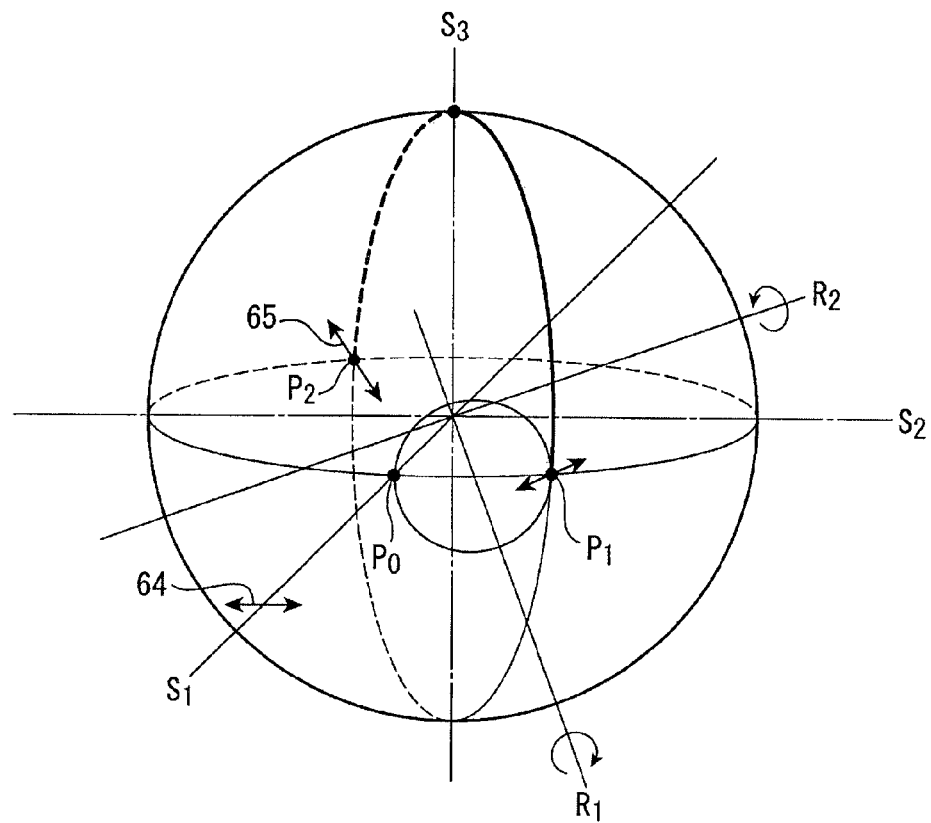

For example, in the embodiment, the laminated wave plate 1 has a structure in which the first wave plate 2 disposed at the incident side and the second wave plate 3 disposed at the emitting side are laminated in a manner making their optical axes intersect with each other. However, as shown in FIGS. 11A and 11B, the laminated wave plate composed of the first wave plate 2 and the second wave plate 3 that are laminated in a manner making their optical axes intersect with each other may have a structure in which refraction gratings 4 are formed on both faces or one face thereof. For example, referring to FIG. 11A, the refraction gratings 4 are formed on both faces of the laminated wave plate composed of the first wave plate 2 and the second wave plate 3 laminated in a manner making their optical axes intersect with each other. For example, referring to FIG. 1B, the refraction gratings 4 are formed on one face of the laminated wave plate composed o the first wave plate 2 and the second wave plate 3 laminated such that their optical axes intersect with each other.

As a structure or a forming method of the refraction gratings 4 on the wave plate, those disclosed in JP-A-2004-341471 and JP-A-2001-281432, for example, may be used.

According to this structure, the refraction gratings and the laminated wave plate are integrated, the gratings (refraction gratings) are not required to be separately formed in the optical path, decreasing the number of components.

Note that the disposing position of the laminated wave plate 1 of the invention is not limited to the above-mentioned embodiment.

Further, the laminated wave plate 1 of the invention is applicable not only the optical pickup device but also a projector.

The invention is applicable to a laminated wave plate used in an optical pickup device, and other devices.

What is claimed is:

1. A laminated wave plate corresponding to a plurality of wavelengths including at least two wavelengths of $\lambda_A$ and $\lambda_B$, and including a first wave plate disposed on an incident side and a second wave plate disposed on an emitting side, the first wave plate and the second wave plate being laminated in such a manner that their optical axes are intersected each other, the laminated wave plate satisfying the following equations from (1) to (5):

$$\Gamma_{A1}=360°+360°\times 2N_A \quad (1);$$

$$\Gamma_{A2}=180°+360°\times N_A \quad (2);$$

$$\Gamma_{B1}=360°\times 2N_B \quad (3);$$

$$\Gamma_{B2}=360°\times N_B \quad (4); \text{ and}$$

$$N_B=(\Delta n_B/\Delta n_A)\times(\lambda_A/\lambda_B)\times(0.5+N_A) \quad (5),$$

wherein $N_A$ is a positive integer $\Gamma_{A1}$ is a phase difference of the wavelength $\lambda_A$ at the first wave plate, $\Gamma_{A2}$ is a phase difference of the wavelength $\lambda_A$ at the second wave plate, $\Gamma_{B1}$ is a phase difference of the wavelength $\lambda_B$ at the first wave plate, $\Gamma_{B2}$ is a phase difference of the wavelength $\lambda_B$ at the second wave plate, $\theta_1$ is an in-plane azimuth of the first wave plate, $\theta_2$ is an in-plane azimuth of the second wave plate, $\Delta n_A$ is a birefringent difference that is a difference ($ne_A - no_A$) between a normal ray refractive index $no_A$ and an abnormal ray refractive index $ne_A$ of the wavelength $\lambda_A$, and $\Delta n_B$ is a birefringent difference that is a difference ($ne_B - no_B$) between a normal ray refractive index $no_B$ and an abnormal ray refractive index $ne_B$ of the wavelength $\lambda_B$, under conditions of $\theta_1=-21°$, and $\theta_2=45°$.

2. The laminated wave plate according to claim 1, wherein a combination of ($N_A$, $N_B$) is one of the following combinations from (a1) to (a4):

$$(N_A, N_B)=(2.0, 2.0) \quad (a1);$$

$$(N_A, N_B)=(3.0, 3.0) \quad (a2);$$

$$(N_A, N_B)=(8.0, 7.0) \quad (a3); \text{ and}$$

$$(N_A, N_B)=(9.0, 8.0) \quad (a4).$$

3. The laminated wave plate according to claim 1, wherein one of the wavelengths $\lambda_A$ and $\lambda_B$ is in a wavelength band from 390 nm to 410 nm.

4. An optical pickup device, comprising:
a laser light source;
an objective lens condensing laser light on a recording medium; and
a detector detecting light emitted after being condensed by the objective lens and being reflected by the recording medium,
wherein the laminated wave plate according to claim 1 is disposed on an optical path between the laser light source and the objective lens.

\* \* \* \* \*